(12) United States Patent
Mori et al.

(10) Patent No.: US 7,671,747 B2
(45) Date of Patent: Mar. 2, 2010

(54) WIRELESS TAG AND METHOD OF READING DATA FROM A WIRELESS TAG

(75) Inventors: Hidekazu Mori, Mishima (JP); Atsushi Ishikawa, Izunokuni (JP); Satoshi Ohishi, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 415 days.

(21) Appl. No.: 11/669,293

(22) Filed: Jan. 31, 2007

(65) Prior Publication Data

US 2007/0182560 A1   Aug. 9, 2007

(30) Foreign Application Priority Data

Jan. 31, 2006   (JP) ............................. 2006-023077
Dec. 15, 2006   (JP) ............................. 2006-338491

(51) Int. Cl.
*G08B 13/14* (2006.01)
(52) U.S. Cl. ................ 340/572.7; 340/572.1; 340/572.5

(58) Field of Classification Search ............. 340/572.7, 340/572.1, 572.5, 572.8
See application file for complete search history.

(56) References Cited

U.S. PATENT DOCUMENTS

| 6,133,834 A | * | 10/2000 | Eberth et al. ............. 340/572.5 |
| 2005/0081374 A1 | * | 4/2005 | Eckstein et al. ............... 29/825 |

FOREIGN PATENT DOCUMENTS

| JP | 2003-188765 | 7/2003 |
| JP | 2004-120055 | 4/2004 |
| JP | 2005-101706 | 4/2005 |

\* cited by examiner

Primary Examiner—Toan N Pham
Assistant Examiner—Kerri McNally
(74) Attorney, Agent, or Firm—Turocy & Watson, LLP

(57) ABSTRACT

If the frequency of the electric waves used at a pre-designated inspection site is known frequency, the antenna seal connected to a base antenna is peeled off, in part or entirety. Thus, the resonance frequency is easily and correctly adjusted to the frequency known.

6 Claims, 3 Drawing Sheets

WIRELESS TAG AND METHOD OF READING DATA FROM A WIRELESS TAG

CROSS-REFERENCE TO RELATED APPLICATIONS

This application is based upon and claims the benefit of priority from the prior Japanese Patent Applications No. 2006-23077, filed on 31 Jan., 2006 and No. 2006-338491, filed on 15 Dec. 2006, the entire contents of which are incorporated herein by reference.

BACKGROUND OF THE INVENTION

1. Field of the Invention

The present invention relates to a Wireless Tag that can cope with the situation where the communication electric waves differ in frequency from place to place, and a method of reading data from the Wireless Tag.

2. Description of the Related Art

In recent years, Wireless Tags, each storing an ID, have come into use. The Wireless Tag has a memory area in and from which the ID and any desired data can be written and read by wireless, without setting the tag into contact with a data write/read device. For example, Wireless Tags using the UHF-band electric waves have come into use in international physical distribution, such as international mail, international freight, and baggage inspection at international airports.

However, the frequency at which data is written into and read from Wireless Tags differs from area to area. For example, the frequency used in Europe ranges from 866 to 870 MHz, the frequency used in the United States ranges from 902 to 928 MHz, and the frequency used in Japan ranges from 950 to 956 MHz.

Consequently, the data written into a Wireless Tag in, for example, Europe cannot be read at all. If the data is read in Japan, it will be incorrect, due to the low data-reading accuracy. This raises a problem.

To solve the problem, the resonance frequency allocated to the antenna of the Wireless Tag may be adjusted. More precisely, a dielectric member may be attached to the antenna, or the dielectric seal already adhered to the antenna is peeled off (refer to Jpn. Pat. Appln. Laid-Open Publication No. 2005-101706).

In the method of attaching a dielectric member to the antenna, however, an error may be made in the position or size of the dielectric member attached. Inevitably, it is difficult to adjust the resonance frequency with high accuracy. The method of peeling off the dielectric seal cannot achieve good results if the frequency of the electric waves greatly differs from area to area, as in the inspection of international cargo. This is because this method is to adjust the resonance frequency minutely if the data cannot be correctly read from the Wireless Tag. The method peeling off the dielectric seal can indeed lower the resonance frequency, but it cannot cope with the case where the resonance frequency should be raised. Further, in this method it is necessary to determine an appropriate amount in which to peel off the dielectric seal from the antenna.

BRIEF SUMMARY OF THE INVENTION

It is an object of the present invention to provide a Wireless Tag whose resonance frequency can be adjusted easily and accurately.

In an aspect of the present invention, there is provided a Wireless Tag that includes an antenna configured to transmit and receive electric waves. The antenna has a base antenna unit and an antenna seal. The antenna seal is connected to the base antenna unit, has instructions for adjusting a resonance frequency of the antenna to a known frequency of electric waves used, and is configured to be peeled off. The antenna seal can be peeled off in part or entirety in accordance with the instructions.

DETAILED DESCRIPTION OF THE INVENTION

Throughout this description, the embodiments and examples shown should be considered as exemplars, rather than limitations on the apparatus and methods of the present invention.

Wireless Tags according to an embodiment of the present invention will be described in detail, with reference to the accompanying drawings.

Figure 1A:
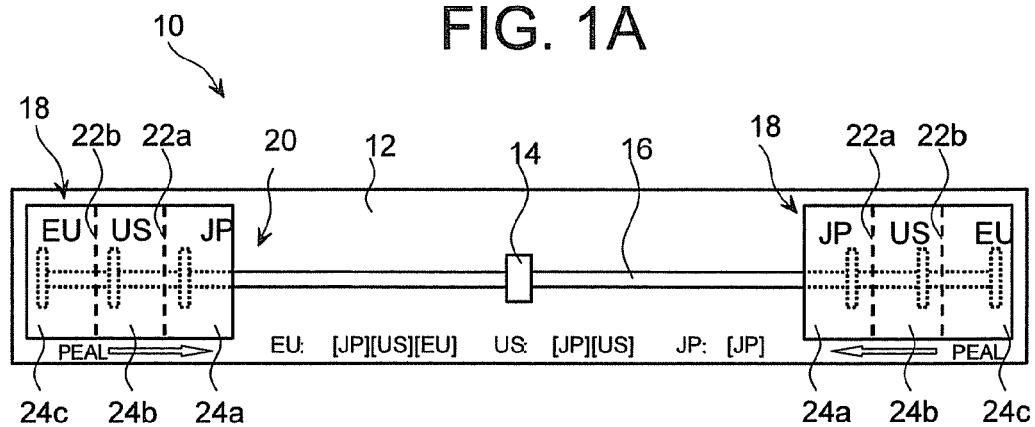
FIG. 1A is a plan view showing a Wireless Tag according to a first embodiment, which remains in the initial state.

FIG. 1A is a plan view showing a Wireless Tag according to a first embodiment, which remains in the initial state. The Wireless Tag 10 has a base 12, an IC chip (memory chip) 14, a base antenna 16, and antenna seals 18. The IC chip 14 is embedded in the base 12. The base antenna 16 is provided on one surface of the base 12. The antenna seals 18 are bonded to the surface of the base 12 and connected to the base antenna 16. The base antenna 16 is connected to the IC chip 14. The base antenna 16 and the antenna seals 18 constitute an antenna 20.

The Wireless Tag 10 further has various circuits (not shown). The circuits are: a rectifier circuit, a receiver circuit, a transmitter circuit, a power-supply circuit, and a control circuit. The rectifier circuit rectifies the AC current generated at the antenna 20. The receiver circuit demodulates any signals it has received. The transmitter circuit modulates response signals and transmits them to a reader-writer. The power-supply circuit applies a DC voltage to the other circuits of the Wireless Tag 10. The control circuit controls the other circuits of the tag 10.

The antenna seal 18 is composed of a flexible seal substrate and an antenna pattern each. The substrate is made of resin. The antenna pattern is provided on the substrate and made of conductive material such as metal. The antenna pattern has perforations 22a and 22b. The perforations 22a and 22b divide the antenna pattern into three regions 24a, 24b and 24c, which are, nonetheless, electrically connected to each other. The three regions 24a, 24b and 24c should preferably have different colors so that they may better be distinguished than otherwise.

The antenna seals 18 are bonded to the end parts of the base antenna 16, respectively. Therefore, they make the antenna 20 symmetrical in the lengthwise direction as will be described later, when any two corresponding regions are peeled off, respectively, from the end parts of the base antenna 16.

The abbreviation "JP" is printed on each region 24a, indicating that this region corresponds to the frequency band of 950 to 956 MHz at which data can be read and written, by wireless, from and into the Wireless Tag 10 in Japan. Similarly, the abbreviation "US" is printed on each region 24b, indicating that this region corresponds to the frequency band of 902 to 928 MHz at which data can be read and written, by wireless, from and into the Wireless Tag 10 in the United States. The abbreviation "EU" is printed on each region 24c, indicating that this region corresponds to the frequency band of 866 to 870 MHz at which data can be read and written, by wireless, from and into the Wireless Tag 10 in the members of the European Unit(not necessarily all members).

Hence, while the Wireless Tag 10 remains in the state shown in FIG. 1A, the antenna 20 of the Wireless Tag 10 is allocated to the resonance frequency at which data can be read and written, by wireless, from and into the tag 10 in the members of the European Union.

The Wireless Tag 10 is suitable for use in the case where the frequency at which data is read and written by wireless from and into the tag 10 gradually increases as the load is transported from an area to another. Assume that the Wireless Tag 10 is attached to a load transported from a European Unit member to the United States, and thence to Japan. First, in the European Union member, the data about the load is written into the Wireless Tag 10, and the tag 10 is attached to the load in the state shown in FIG. 1A.

Figure 1B:
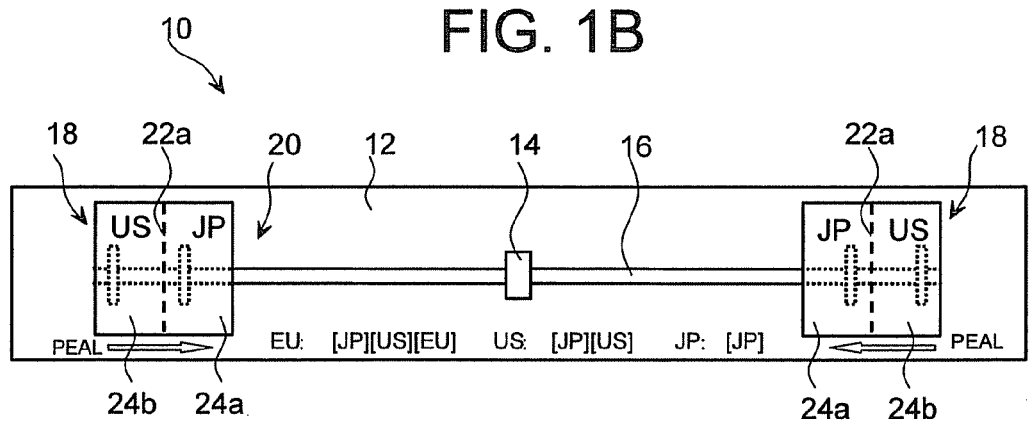
FIG. 1B is a plan view showing the Wireless Tag of FIG. 1A, which is being used in a certain manner.

Next, the load arrives at the United States. In the United States, it is practically impossible to read data by wireless from the Wireless Tag 10 that assumes the state shown in FIG. 1A. To read the data, the person who has received the load in the United States peels off the two regions 24c, along the perforations 22b. Those parts of the base antenna 16, which lie under the regions 24c, are peeled off, too. As a result, the Wireless Tag 10 changes in configuration as is illustrated in FIG. 1B. As a result, the resonance frequency of the antenna 20 increases before peeling-off to change to the frequency used in the United States. Hence, the data can be read from the Wireless Tag 10 and new data can be written into the Wireless Tag 10.

To avoid errors in peeling off the wireless IC seals 18, it is desirable to print on the tag 10 arrows and phrases (e.g., PEAL, Direction for Peeling, or the like), indicating the direction in which to peel off the antenna seals 18. If the base 12 has an area available for printing, "EU: [JP] [US] [EU]," "USA: [JP] [US]," "JPN [JP]," or the like may be printed, showing where the Wireless Tag 10 has been used and can be used.

Figure 1C:
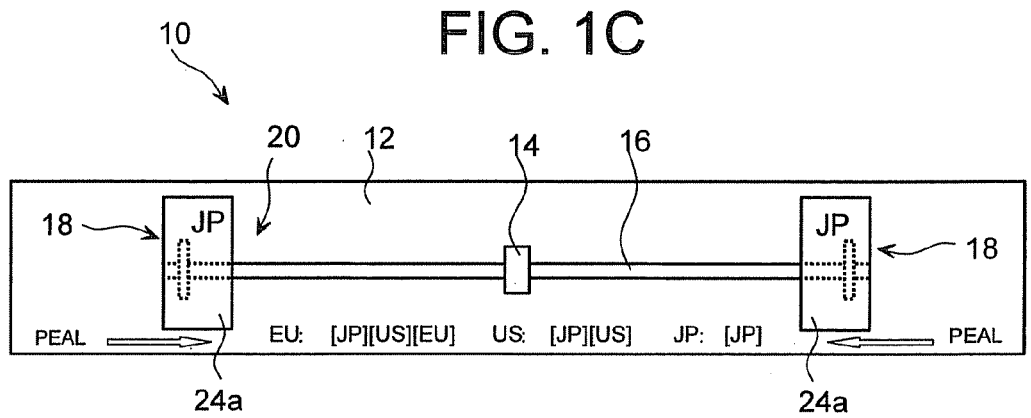
FIG. 1C is a plan view showing the Wireless Tag being used in another manner.

Then, the load arrives at Japan. In Japan, it is practically impossible to read the data by wireless from the Wireless Tag 10 remaining in the state shown in FIG. 1B. To read the data, the person who has received the load peels off the two regions 24b, along the perforations 22a. As a result, the Wireless Tag 10 changes in configuration as is illustrated in FIG. 1C. As a result, the resonance frequency of the antenna 20 changes to the frequency used in Japan. Hence, the data can be read from the Wireless Tag 10 and new data can be written into the Wireless Tag 10.

Thus, the Wireless Tag 10 is so configured that any person can easily peel off the prescribed regions of each antenna seal 18 in accordance with the marks or instructions printed on the tag 10. Hence, the Wireless Tag 10 can well cope with the fact that the frequency at which the data is read and written by wireless from and into the tag 10 differs from area to area. Further, the amount in which the antenna seals 18 are peeled off is the same, no matter who peels them. Therefore, an antenna 20 from which a person has peeled off the antenna seals 18 has the same resonance frequency as another antenna 20 from which another person has peeled off the seals 18. This can prevent troubles in the process of reading the data from the Wireless Tag 10, because of the fact that the frequency used to read and write data from and into Wireless Tags differs from area to area.

The Wireless Tag 10 can of course be attached to a load to be transported from EU to US, a load to be transported from EU to JP, and a load to be transported from US to JP.

Figure 2:
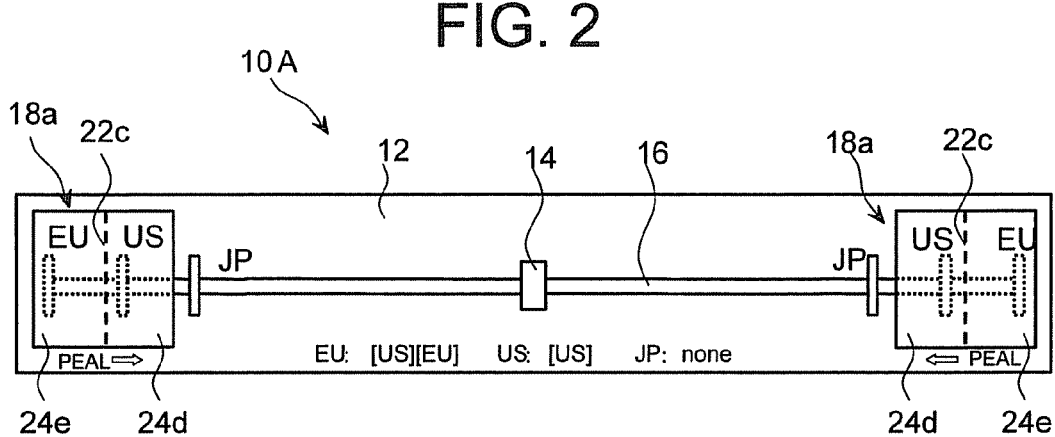
FIG. 2 is a plan view showing a modification of the Wireless Tag shown in FIGS. 1A to 1C.

FIG. 2 is a plan view of a Wireless Tag 10A that is a modification of the Wireless Tag 10 shown in FIG. 1A to 1C. This Wireless Tag 10A has a base antenna 16 that has the resonance frequency used in Japan. Two antenna seals 18a are bonded to the base antenna 16 and have a perforation 22c each. The perforation 22c divides the antenna seal 18a into two regions 24d and 24e. "US," "EU" and "JP" are printed on the region 28d, region 28e and the base 12, respectively.

This Wireless Tag 10A is used in the same way as the Wireless Tag 10. That is, in any member of the European Union, the Wireless Tag 10A is used, having both antenna seals 18a bonded to the base 12, each seal 18a having both regions 24d and 24e. In the United States, it is used, having both antenna seals 18a bonded to the base 12, each seal 18a having the region 24d only, with the region 24e peeled off. In Japan, it is used, with both regions 24d and 24e peeled off (that is, antenna seals 18a have been peeled off).

Figure 3:
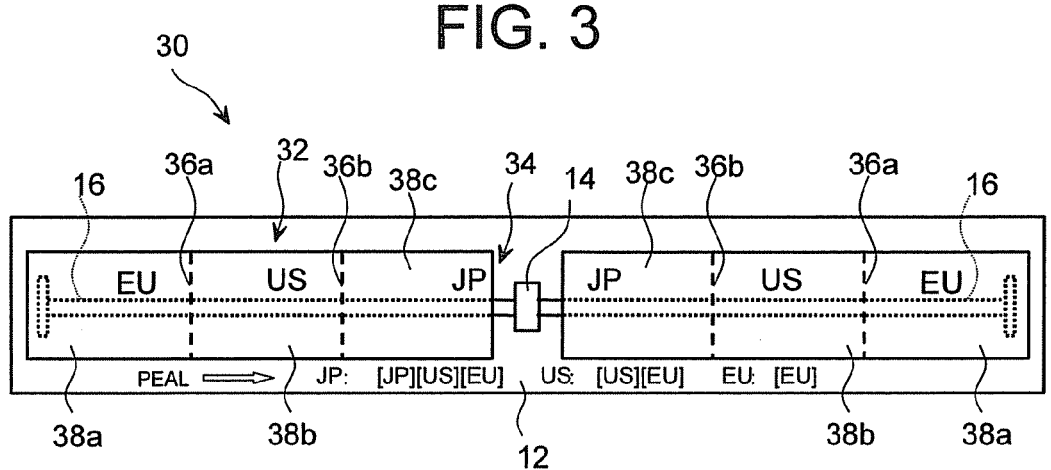
FIG. 3 is a plan view showing a Wireless Tag according to a second embodiment, which remains in the initial state.

FIG. 3 is a plan view showing a Wireless Tag 30 according to the second embodiment of this invention, which remains in the initial state. This Wireless Tag 30 has dielectric seals 32 in place of such antenna seals 18a as used in the Wireless Tag 10 described above. That is, the Wireless Tag 30 comprises a base 12, an IC chip 14 embedded in the base 12, a base antenna 16 provided on one surface of the base 12, and dielectric seals 32 bonded to the base antenna 16.

The dielectric seals 32 increase the floating capacitance in the base antenna 16. The antenna 34 therefore has a higher resonance frequency than the base antennas 16 in the state illustrated in FIG. 3.

The dielectric seals 32 are flexible substrates made of resin and fine particles of dielectric ceramic uniformly dispersed in the resin. Each dielectric seal 32 has slits 36a and 36b. The slits 36a and 36b divide the dielectric seal 32 into three regions 38a, 38b and 39c. The three regions 38a, 38b and 38c should preferably have different colors so that they may be better be distinguished than otherwise.

"EU," "US" and "JP" are printed on the regions 38a, 38b and 38c, respectively. These abbreviations mean the same areas as on the Wireless Tag 10 described above.

Figure 4:
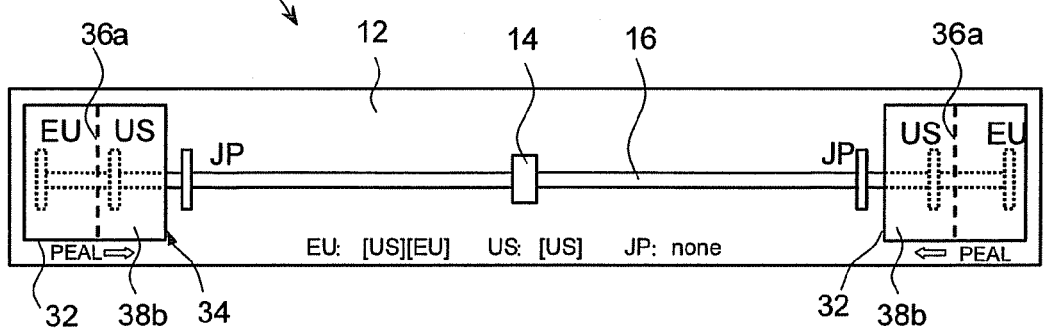
FIG. 4 is a diagram explaining how to peel a dielectric seal off.

This Wireless Tag 30 is suitable for use in the case where the frequency at which data is read and written by wireless from and into it gradually deceases as the load is transported from an area to another. Assume that the Wireless Tag 30 is attached to a load transported from Japan to the United States, and thence to a European Union member. In this case, in Japan, the data about the load is written into the Wireless Tag 30, and the tag 30 is attached to the load. Next, the load arrives at the United States. In the United States, the person who has received the load peels off the two regions 38c, along the slits 36b. At this point, only the dielectric seals are peeled off, and the base antenna 16 remains intact, as is illustrated in FIG. 4. As described above, the dielectric seals are substrates made of resin and fine particles of dielectric ceramic uniformly dispersed in the resin. Hence, the frequency increases due to "wave-compressing effect" as the dielectric seals approach the base antenna 16. The wave-compressing effect decreases when the dielectric seals are peeled off. Therefore, the resonance frequency becomes lower. The resonance frequency of the antenna 34 of the Wireless Tag 30 therefore changes to the frequency of the electric waves used in the United States. When the load arrives at the European Union member, the person who has received the load peels off the two regions 38b, along the slits 36a. The resonance frequency of the antenna 34 of the Wireless Tag 30 therefore changes to the frequency of the electric waves used in the European Union member.

Needless to say, the Wireless Tag 30 can be modified in configuration in the same way as the Wireless Tag 10 is modified into the Wireless Tag 10A.

Embodiments of the present invention have been described. The invention is not limited to the embodiments, nonetheless. Various changes can be made within the scope of the invention. More specifically, the antenna seals used to raise the resonance frequency and the dielectric seals used to lower the resonance frequency may be both bonded to the base 12. Then, resonance frequency can be lowered if necessary after the antenna seals have been peeled and the resonance frequency has thereby been raised. Conversely, the resonance frequency can be raised if necessary after the dielectric seals have been peeled and the resonance frequency has thereby been lowered.

Figure 5:
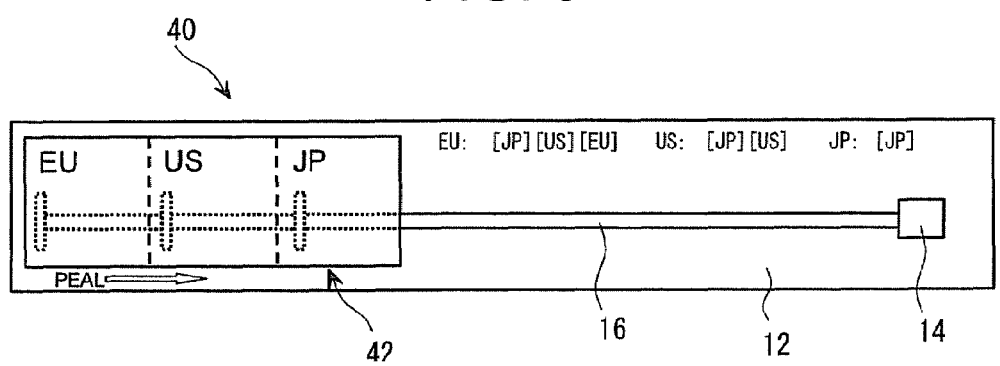
FIG. 5 is a plan view showing another modification of the Wireless Tag shown in FIGS. 1A to 1C.

Moreover, the components of the embodiments described above may be combined in any appropriate manner in order to make various inventions. For example, some of the component of any embodiment may not be used. Moreover, the components of the different embodiments may be combined in any desired fashion. A specific example is such a Wireless Tag 40 as shown in FIG. 5. This tag 40 has an antenna seal 42 that has the same composition as the antenna seals 18 and bonded to only one end of the base antenna 16, not to both ends of the base antenna 16 as the antenna seals 18 in the Wireless Tag 10. This simplify the work of peeling off the antenna seal. This configuration can be applied to dielectric seals, if any, provided on the base antenna 16.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. A wireless tag comprising an antenna configured to transmit and receive electric waves and having:
    a base antenna unit; and
    an antenna seal unit connected to the base antenna unit, having instructions for adjusting a resonance frequency of the antenna to a known frequency of electric waves used and configured to be peeled off,
    wherein the antenna seal is able to be peeled off in part or entirety in accordance with the instructions.

2. The wireless tag according to claim 1, wherein the antenna seal unit has a perforation or a slit along which a part of the antenna seal unit is to be peeled off in accordance with the instructions.

3. The wireless tag according to claim 2, wherein the perforation or slit divides the antenna seal unit into regions, and the regions have different colors.

4. A wireless tag comprising an antenna configured to transmit and receive electric waves and having:
    a base antenna unit; and
    a dielectric seal unit connected to the base antenna unit, having instructions for adjusting a resonance frequency of the antenna to a known frequency of electric waves used and configured to be peeled off.

5. The wireless tag according to claim 4, wherein the dielectric seal unit has a perforation or a slit along which a part of the dielectric seal unit is to be peeled off in accordance with the instructions.

6. The wireless tag according to claim 5, wherein the perforation or slit divides the dielectric seal unit into regions, and the regions have different colors.

* * * * *